July 22, 1969  R. H. BLACKFORD  3,456,682

VALVE DISC

Filed Nov. 21, 1966

*INVENTOR.*
RAYMOND H. BLACKFORD
*BY*
Paul & Paul
ATTORNEYS.

United States Patent Office 3,456,682
Patented July 22, 1969

3,456,682
VALVE DISC
Raymond H. Blackford, Hartsdale, N.Y., assignor to Durable Manufacturing Company, New York, N.Y., a corporation of New York
Filed Nov. 21, 1966, Ser. No. 595,854
Int. Cl. F16k 15/10, 25/00
U.S. Cl. 137—516.17                    7 Claims

ABSTRACT OF THE DISCLOSURE

A valve disc for a check valve wherein the disc is adapted for reciprocation between the valve seat and a guard consisting solely of alternate substantially co-extensive layers of sheet metal and sheet rubber, with adjacent layers permanently bonded together in complete surface-to-surface engagement to form a rigid laminated unitary disc.

This invention relates to a valve disc and particularly to a valve disc made up of alternate laminations of metal and rubber.

Check valves characterized by a reciprocating valve disc are known, the arrangement being such that spring forces continually urge the disc toward the valve seat to close the valve passage and cushion movement of the disc when it opens due to fluid pressure. When the disc seats, it sometimes strikes the valve seat with considerable force, and when it is unseated it sometimes strikes the guard with considerable force. As a result of repeated concussions between the disc and the guard on the one hand the disc and the seat on the other, the disc ultimately fails.

Accordingly, a principal object of the invention is to provide a valve disc which is inherently capable of reducing the intensity of the concussions, in consequence of which the useful life of the disc is prolonged.

Another object is to provide a laminated valve disc with at least one lamina of rubber for absorbing shock and yielding to enable the sealing surface of the disc to adjust to the plane of the valve seat.

Figure 1:
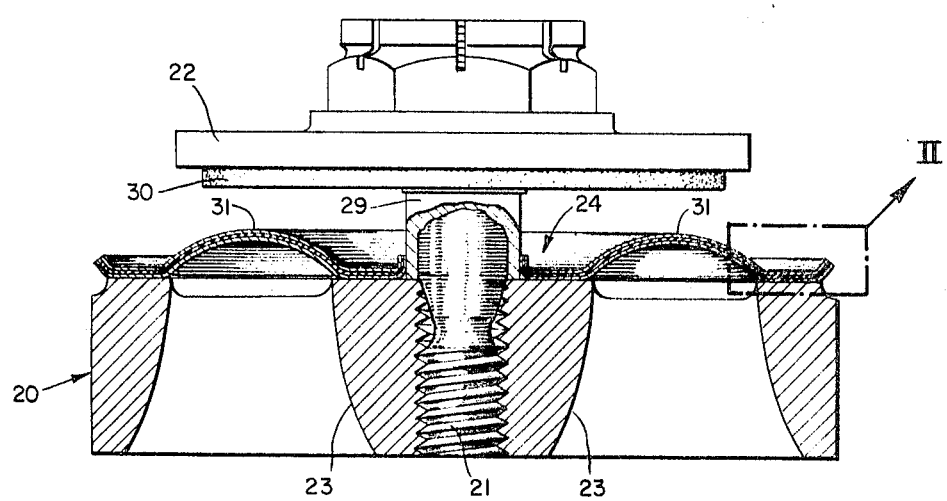
Figure 2:
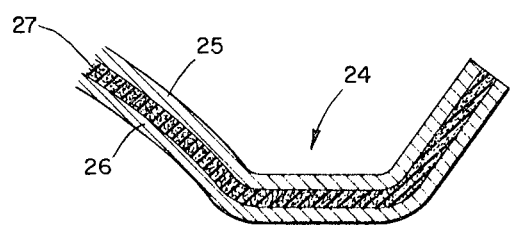

Other objects of the invention will become apparent when the following description is read with reference to the accompanying drawing, in which:

FIG. 1 is an elevation of a check valve having a valve or sealing disc constructed in accordance with the invention, a portion of the check valve being shown in longitudinal section; and FIG. 2 is an enlarged showing of the area designated II in FIG. 1.

The following description is directed to the specific form of the invention shown in the drawing. It is not addressed to the scope of the invention, which may be practiced in a variety of forms.

Turning to the drawing, the valve comprises a seat member 20 having a stud 21 in threaded relation, and a guard 22 is provided in fixed position relative to the stud 21, and spaced above the seat 20. The seat 20 is provided with ports 23 for the fluid. A valve disc 24 is fitted loosely around a collar 29 which surrounds the stud 21 for reciprocating movement back and forth between the seat 20 and the guard 22.

The valve disc 24 has an upper metal layer 25 and a lower metal layer 26 together with an intervening layer 27 composed of rubber or other yieldable or resilient material. The layers 25, 26 and 27 preferably are permanently bonded together as one substance by any known process.

Rubber suitable for use in accordance with this invention may be manufactured in a variety of ways, and is a staple article of commerce known per se in the rubber art. It must be readily deformable and must return elastically and repeatedly to its original shape.

Mounted on the underside of guard 22 is a ring 30, arranged in the path of reciprocation of the arched portion 31 of valve disc 24. Ring 30 may be a permanent magnet of such polarity that it repels the disc 24, or a spring or any other means may be arranged between disc 24 and ring 30 to minimize concussion as heretofore discussed.

It will be appreciated that, when the disc 24 reciprocates, its lowermost position places the disc against the seat 20 thus preventing flow of fluid through the ports 23, and the upper position of disc 24 places the arched portion 31 in contact with the ring 30, with the rubber layer 27 spaced slightly away from the ring 30 by the metal layer 25.

Any number of alternate layers of rubber may be provided in the valve, and they may in many cases be applied as the outer layers which contact the guard and the stud. For example, in FIG. 2, the layers 25 and 26 may consist of rubber and the layer 27 metal, plastic or the like.

The inherent ability of the valve disc to reduce the intensity of the impact which results when the disc is seated to close the valve passage and when it strikes the guard upon being unseated to open the valve passage may be explained briefly as follows:

When fluid pressure unseats the disc and moves it toward the guard 22 and the underlying ring 30, for example, the disc possesses kinetic energy, and each component part of the disc possesses a share of said kinetic energy. When the lamina 25 strikes the ring 30, its energy is expended in the resulting impact, but that of lamina 26 is not used up at the same instant. Part of the kinetic energy of the lamina 26 must be expended in compressing the rubber lamina 27 before the balance of the kinetic energy of the lamina 26 can be transmitted through the laminae 27 and 25 to the ring 30 and guard 22. Thus, a period of time elapses between the impulse which absorbs the kinetic energy of the lamina 25 and the impulse which absorbs the kinetic energy of the lamina 26. During this period of time delay, the rubber lamina 27 acts as a cushion and reduces the intensity of the concussion. In the absence of the rubber lamina 27, the disc would be subject to one impact or impulse due to the total kinetic energy, instead of to successive impacts or impulses each due to a fraction of the total energy. The disc can withstand larger numbers of successive impacts or impulses of reduced intensity more readily than a fewer number of impacts or impulses of greater magnitude.

Although this invention has been disclosed with reference to a specific form thereof, it will be appreciated that various modifications may be made, including the substitution of equivalent elements, the use of certain features independently of other features, and reversals of parts, all without departing from the spirit and scope of this invention as defined in the appended claims.

The following is claimed:

1. In a valve disc for a check valve wherein the disc is adapted for reciprocation between the valve seat and a guard, the combination consisting solely of alternate substantially co-extensive layers of sheet metal and sheet rubber, with adjacent layers permanently bonded together in complete surface-to-surface engagement to form a rigid laminated unitary disc, said disc having an interface between a rubber layer and a metal layer, said interface including an annular inner area extending about a central aperture, an annular outer area extending about said inner area, spaced radially therefrom and disposed in the same plane, and an annular arched area extending out of said plane and connecting said inner and outer areas.

2. The valve disc according to claim 1 wherein an inner layer is of metal.

3. The valve disc according to claim 1 wherein an inner layer is of rubber.

4. A valve disk for a check valve consisting solely of alternate layers of material comprising at least one layer of sheet metal having a first surface and at least one layer of resilient rubber-like material, opposed ones of said layers having adjacent surfaces in substantially complete surface-to-surface engagement to form a rigid laminated unitary disk; said disk being constructed substantially completely as a laminated composite layer member, said metal layer having an inner portion having a first surface portion thereof disposed in a first plane, an annular outer portion extending about said inner portion, spaced radially therefrom and having a first surface portion thereof disposed in said first plane, and an annular arched portion having a first surface portion thereof extending out of said first plane and connecting said inner and outer first surface portions.

5. The valve disk of claim 4, wherein said inner portion is provided with a central aperture.

6. The valve disk of claim 5, wherein the radial innermost end of said inner metal portion protrudes away from said first plane as an annulus, in the same direction as said arched area portion, relative to said first plane.

7. The valve disk of claim 4, wherein all portions of said metal layer are of the same material thickness.

References Cited

UNITED STATES PATENTS

| 810,672 | 1/1909 | Prellwitz | 137—516.15 XR |
| 1,145,113 | 7/1915 | Bryen | 137—516.19 |
| 1,488,147 | 3/1924 | Bryen et al. | 137—516.19 |
| 1,900,228 | 3/1933 | Dean | 137—516.19 XR |
| 3,076,470 | 2/1963 | Langdon | 251—358 XR |

FOREIGN PATENTS 206,061  11/1923  Great Britain.

STANLEY N. GILREATH, Primary Examiner

W. H. SCHROEDER, Assistant Examiner

U.S. Cl. X.R.

137—533.27; 251—358